(12) United States Patent
Maharyta

(10) Patent No.: US 10,310,687 B2
(45) Date of Patent: Jun. 4, 2019

(54) MULTI-PHASE SELF-CAPACITANCE SCANNING OF SENSORS ARRAYS

(71) Applicant: Cypress Semiconductor Corporation, San Jose, CA (US)

(72) Inventor: Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/475,412

(22) Filed: Mar. 31, 2017

(65) Prior Publication Data

US 2018/0164914 A1 Jun. 14, 2018

Related U.S. Application Data

(60) Provisional application No. 62/434,319, filed on Dec. 14, 2016.

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ........................ G06F 3/044; G06F 2203/04104
See application file for complete search history.

(56) References Cited

U.S. PATENT DOCUMENTS 8,120,591 B2   2/2012 Krah et al.
8,681,122 B2   3/2014 Pirogov et al.
8,860,682 B1 *  10/2014 Kremin .............. G06F 3/0416
                                                324/678
9,229,549 B1 *   1/2016 Lee .................... G06F 3/041
9,377,493 B2    6/2016 Hogan et al.
9,489,097 B2   11/2016 Johansson et al.
2010/0244859 A1 *  9/2010 Cormier, Jr. ........... G06F 3/044
                                                324/678

(Continued)

FOREIGN PATENT DOCUMENTS

CN   105830345 A   8/2016
CN   106164833 A   11/2016

OTHER PUBLICATIONS

International Search Report for International Application No. PCT/US17/47160 dated Sep. 21, 2017; 3 pages.

(Continued)

*Primary Examiner* — Ariel A Balaoing

(57) ABSTRACT

Techniques for multi-phase self-capacitance (MPSC) scanning of a sensor array are described herein. In an example embodiment, a device comprises a sensor logic coupled to a processing logic. The sensor logic is configured to concurrently sense multiple sensor elements of the sensor array in each of multiple scanning operations in order to obtain multiple measurements, where each measurement represents a collective charge of the multiple sensor elements accumulated during a corresponding scanning operation. The processing logic is configured to determine data values based on the obtained multiple measurements, where the data values respectively represent self-capacitances of the multiple sensor elements.

20 Claims, 10 Drawing Sheets

(56) References Cited

U.S. PATENT DOCUMENTS

| | | | |
|---|---|---|---|
| 2011/0279407 A1* | 11/2011 | Kim | G06F 3/044 |
| | | | 345/174 |
| 2012/0268142 A1 | 10/2012 | Kremin et al. | |
| 2013/0127779 A1* | 5/2013 | Lillie | G06F 3/0416 |
| | | | 345/174 |
| 2015/0054752 A1* | 2/2015 | Mackey | G06F 3/044 |
| | | | 345/173 |
| 2015/0193047 A1 | 7/2015 | Hoshtanar et al. | |
| 2016/0188105 A1 | 6/2016 | Kremin et al. | |
| 2016/0320911 A1 | 11/2016 | Crandall et al. | |

OTHER PUBLICATIONS

Written Opinion of the International Searching Authority for International Application No. PCT/US17/47160 dated Sep. 12, 2017; 6 pages.

Ye, Zhi, "High Precision Active-Matrix Self-Capacitive Touch Panel Based on Fluorinated ZnO Thin-Film Transistor," IEEE Journal of Display Technology, Nov. 2009, pp. 1-8; 8 pages.

\* cited by examiner

US 10,310,687 B2

MULTI-PHASE SELF-CAPACITANCE SCANNING OF SENSORS ARRAYS

PRIORITY

This application claims the priority and benefit of U.S. Provisional Application No. 62/434,319, filed on Dec. 14, 2016, the entire content of which is incorporated by reference herein.

TECHNICAL FIELD

This disclosure generally relates to the field of touch-sensor devices and, in particular, to processing of touch sensor data.

BACKGROUND

Computing devices, such as laptop/notebook computers, mobile communication devices, portable entertainment devices (e.g., handheld video games, multimedia players, etc.), and the like, may include user interface devices that facilitate interaction between a user and the computing device. One type of user interface device that has become common is a touch-sensor device or touch input device that operates by way of capacitance sensing. A touch-sensor device may be embodied as a touchscreen, touch-sensor pad, touch-sensor slider, or touch-sensor buttons, and may include a touch sensor comprising an array of capacitive sensor elements. Capacitive sensing typically involves scanning operations that periodically measure changes in capacitance associated with the capacitive sensor elements to determine a presence, position, type, and/or movement of a conductive object (e.g., a stylus, a user's finger, etc.) relative to the touch sensor.

Various capacitive sensing applications (e.g., such as automotive applications) need capacitive sensing that limits the interference from electro-magnetic (EM) emissions and supports high-sensitivity and water-proof sensing properties. However, one disadvantage of currently available scanning technology (e.g., such as self-capacitance sensing with active shielding) is that it cannot provide protection from EM emissions while supporting high-sensitivity and water-proof sensing.

DETAILED DESCRIPTION

Figure 1:
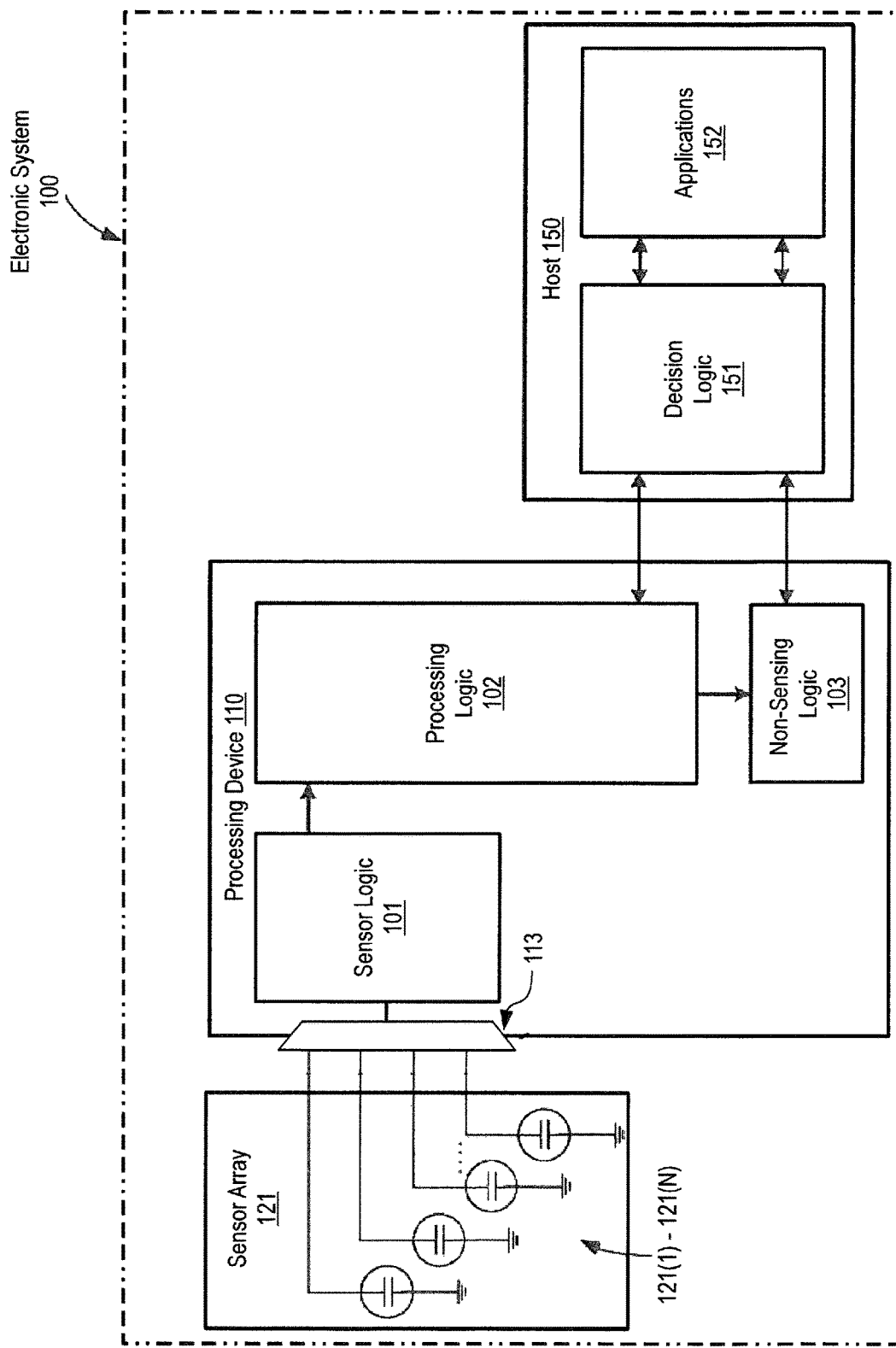
FIG. 1 is a block diagram illustrating an embodiment of an example electronic system in accordance with the multi-phase self-capacitance (MPSC) scanning techniques described herein.

The following description sets forth numerous specific details such as examples of specific systems, components, methods, and so forth, in order to provide a good understanding of various embodiments of the techniques described herein for multi-phase self-capacitance (MPSC) scanning of sensor arrays. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description and in which similar reference numbers may refer to similar components or operations. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Some conventional sensing techniques use single-phase methods to scan a self-capacitance sensor array. For example, a self-capacitance sensing channel connects to one sensor element at a time to sense the charge accumulated thereby, while all other (unused) sensor elements of the sensor array may be connected to an active-shield signal. The active-shield signal may substantially reproduce the sensor excitation signal and is typically used to eliminate the impact of the mutual capacitances of the unused sensor elements on the measurement that represents the self-capacitance of the sensor element being sensed. In other words, all sensor elements of the sensor array are excited (charged) simultaneously, but only one sensor element at a time is being sensed and the obtained measurement is converted into a data value representing the self-capacitance of the sensor element (hence, this method is referred to as being a single-phase scanning method).

One disadvantage of such single-phase scanning methods is that an active-shield signal does not reproduce precisely the shape of the excitation signal, and as a result the mutual capacitances between sensor elements of the array can significantly affect the measurement representing the self-capacitance of the sensor element being sensed. Further, such single-phase methods of scanning produce high electro-magnetic (EM) emissions because all but one of the sensor elements of the sensor array are being excited by the active-shield signal. One way to reduce such high EM emissions is to reduce the excitation voltage that is used to charge the sensor elements. However, reduction of the excitation voltage results in degradation of the sensitivity of the self-capacitance sensor array. Further, in touch-sensor devices that use one self-capacitance sensing channel, it is not possible to simultaneously increase the scan rate while keeping the same signal-to-noise-ratio (SNR).

To address these and other problems related to self-capacitance sensing (e.g., such as hover, proximity, and thick-overlay), described herein are various embodiments of techniques for MPSC scanning of sensor arrays. Unless expressly specified otherwise, "sensor arrays" are also referred to herein as "touch sensors", "touch sensor arrays", and the like. Examples of self-capacitance sensor arrays include, without limitation, capacitive touch-screens, touch-sensor pads, touch-sliders, touch-sensor buttons, and various other ITO-based panels that can be configured to operate as interfaces in response to user-initiated contacts. A user-initiated contact may be a physical touch by a conductive object (e.g., a stylus, a user's finger, and the like) on the touch-surface of the sensor array or a hover in which the conductive object is sufficiently proximate to affect the sensor elements of the sensor array without being in physical touch with the touch-surface thereof. As used herein, "sensor element" refers to a discrete set of one or more electrodes that is separate and distinct from other electrode set(s) in the sensor array.

In one example embodiment, a device comprises a sensor logic coupled to a processing logic. The sensor logic is configured to concurrently (e.g., simultaneously, or substantially simultaneously) sense multiple sensor elements of a sensor array in each of multiple scanning operations to obtain multiple measurements, where each measurement represents a collective charge of the multiple sensor elements accumulated during a corresponding scanning operation. The processing logic is configured to determine, based on the multiple measurements, data values that respectively represent self-capacitances of the multiple sensor elements. In operation, the multiple measurements may be representative of a conductive object that is in contact with or proximate to the sensor array, and the processing logic may be further configured to determine a position of the conductive object on the sensor array based on the data values. In example aspects of this embodiment, during a particular scanning operation the sensor logic is configured to excite a particular group of one or more sensor elements with a signal that has an opposite polarity than signals coupled the remaining sensor elements. In example aspects, the device further comprises a multiplexor logic configured to couple the sensor logic to the sensor elements in accordance with excitation patterns that correspond to the scanning operations. In example aspects, in each of the scanning operations the sensor logic is configured to excite the sensor elements during a pre-charge phase and to measure the collective charge of the sensor elements during a charge-sharing phase. In example aspects, the processing logic is configured to determine the data values based on a matrix of deconvolution coefficients that corresponds to the scanning operations.

In another example embodiment, a method for MPSC scanning of a sensor array comprises the operations of: concurrently sensing multiple sensor elements of the sensor array in each of multiple scanning operations to obtain multiple measurements, where each measurement represents a collective charge of the multiple sensor elements accumulated during a corresponding scanning operation; and determining, based on the multiple measurements, data values that respectively represent self-capacitances of the multiple sensor elements. In operation, the multiple measurements may be representative of a conductive object that is in contact with or proximate to the sensor array, and the method may further comprise the operation of determining a position of the conductive object on the sensor array based on the data values. In example aspects of this embodiment, the method further comprises exciting a particular group of one or more sensor elements during a particular scanning operation with a signal that has an opposite polarity than signals coupled to the remaining sensor elements. In example aspects, the method further comprises exciting the sensor elements according to an excitation matrix that represents excitation patterns corresponding to the scanning operations. In example aspects, the method further comprises exciting the sensor elements during a pre-charge phase in each of the scanning operations, and measuring the collective charge of the sensor elements during a charge-sharing phase. In example aspects, determining the data values comprises converting the multiple measurements based on a matrix of deconvolution coefficients that corresponds to the multiple scanning operations.

In another example embodiment, a system comprises a capacitive sensor array, sensor logic, and processing logic. The sensor array comprises multiple sensor elements, e.g., such as row electrodes and/or column electrodes. The sensor logic is configured to concurrently sense the multiple sensor elements in each of multiple scanning operations to obtain multiple measurements, where each measurement represents a collective charge of the multiple sensor elements accumulated during a corresponding scanning operation. The processing logic is configured to determine, based on the multiple measurements, data values that respectively represent self-capacitances of the multiple sensor elements. In example aspects of this embodiment, during a particular scanning operation the sensor logic is configured to excite a particular group of one or more sensor elements with a signal that has an opposite polarity than signals coupled to the remaining sensor elements. In example aspects, the system may further comprise a multiplexor logic configured to couple the sensor logic to the sensor elements in accordance with excitation patterns that correspond to the scanning operations. In example aspects, the multiple measurements may be representative of a conductive object that is in contact with or proximate to the sensor array, and the processing logic is further configured to determine a position of the conductive object on the sensor array based on the data values.

FIG. 1 illustrates a block diagram of an example electronic system 100 that is configured in accordance with the MPSC scanning techniques described herein. Electronic system 100 includes sensor array 121 that is coupled to processing device 110, which may be coupled to a host 150. Electronic system 100 may be embodied as an electronic device that includes the sensor array as a user interface. Examples of such electronic devices include, without limitations, smart-phones, cellular phones, tablets, notebook computers, personal computers, personal data assistants (PDAs), kiosks, keyboards, televisions, remote controls, monitors, handheld multi-media devices, handheld video players, gaming devices, control panels of a household or industrial appliances, and other computer peripheral, input, and/or handheld devices. Alternatively, electronic system 100 may be embodied as other types of devices that may be configured with touch-sensor user interfaces. It is noted that the components of electronic system 100 may include all the components illustrated in FIG. 1. Alternatively, electronic system 100 may include only some of the illustrated components, or may include additional components that are not illustrated in FIG. 1. Thus, electronic system 100 of FIG. 1 should be regarded in an illustrative rather than a restrictive sense.

Sensor array 121 may be disposed in a touch panel (e.g., such as a touchscreen, a touchpad, a touch-panel with capacitive buttons, etc., having a touch-sensing surface thereon) that may be configured as a user interface to detect a conductive object (e.g., a stylus, a user's finger, etc.) that is in contact with or proximate to the sensor array. Sensor array 121 includes sensor elements 121(1)-121(N). In FIG. 1, for illustration purposes each sensor element 121(1)-121(N) is schematically represented as a capacitor. In various embodiments, sensor elements 121(1)-121(N) may be row electrodes, column electrodes, and/or shaped row and column electrodes that are electrically insulated from each other on the touch panel, but that may be subject to capacitive coupling during operation.

Processing device 110 includes sensor logic 101 that is coupled to processing logic 102, which may also be coupled to non-sensing logic 103. (As used herein, "logic" refers to a set of hardware circuits, blocks, and/or components that may be controlled by various analog/digital signals and is configured to perform certain operations.) Processing device 110 may reside on a common carrier substrate such as, for example, a integrated circuit (IC) die substrate, or a multichip module substrate. In one embodiment, processing device 110 may be a programmable system on a chip that is manufactured on a single IC die such as, for example, a Programmable System on a Chip (PSoC™) processing device developed by Cypress Semiconductor Corporation, San Jose, Calif. Alternatively, processing device 110 may be one or more other processing devices, such as a microprocessor or central processing unit, a controller, a special-purpose processor, a digital signal processor (DSP), an application specific integrated circuit (ASIC), a field programmable gate array (FPGA), or other programmable device. In some embodiments, for example, processing device 110 may be a network processor having multiple processors including a core unit and multiple micro-engines. Additionally, processing device 110 may include any combination of general-purpose processing device(s) and special-purpose processing device(s). In operation, processing device 110 is configured to periodically (e.g., at a certain frequency) perform scanning operations on sensor array 121 according to the MPSC scanning techniques described herein in order to measure changes reflected in the self-capacitances of its sensor elements to determine presence, position, and/or movement of a conductive object relative to the sensor array.

Processing device 110 is coupled to sensor array 121 via multiplexor 113, which may include one or more analog buses, switches, and/or other circuits to transport signals. Processing device 110 (and/or a component thereof, such as sensor logic 101) includes various hardware circuits and/or firmware (e.g., such as a scanning sequencer) to operate multiplexor 113 in accordance with the MPSC scanning techniques described herein. For example, during a pre-charge phase of a scanning operation, processing device 110 (and/or a component thereof) configures multiplexor 113 to couple one or more sensor elements of sensor array 121 to an excitation signal with a given polarity (e.g., phase shift) while at the same time coupling the remaining sensor elements of the sensor array to a signal with a different or opposite polarity (e.g., phase shift). During a charge-sharing phase of the scanning operation, processing device 110 (and/or a component thereof) configures multiplexor 113 to couple the sensor elements of sensor array 121 to a self-capacitance sensing channel of processing device 110, thereby providing for concurrently sensing (scanning) all of the sensor elements.

In the embodiment of FIG. 1, sensor logic 101 is configured to include a self-capacitance sensing channel (not shown) of processing device 110. The self-capacitance sensing channel comprises of hardware circuits that operate to receive and process signals from sensor array 121 through multiplexor 113. Such sensing channel may include a relaxation oscillator, a capacitance sigma-delta (CSD) modulator, a full-wave CSD, a slope convertor ADC (analog-to-digital converter), or other means to process and/or convert a signal received from the sensor array into a measurement (e.g., also referred to as "raw data" or "raw data count") that represents a self-capacitance charge. According to the MPSC sensing techniques described herein, a measurement received from sensor array 121 represents a collective charge of multiple sensor elements 121(1)-121(N) that is accumulated during the pre-charge phase of a scanning operation. In some embodiments, the measurement obtained by sensor logic 101 may be a signal value that represents one or more characteristics of a signal; in addition, or instead of, in some embodiments a signal value may be a value that is derived from the measurement based on a signal characteristic, e.g., such as voltage and/or current magnitude, raw capacitance, and the like. It should be noted that there are various known methods for measuring signal characteristics that represent capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should also be noted that instead of evaluating the measurements (e.g., raw data counts) relative to a threshold, the sensor logic may be configured to evaluate other measured values to determine a user interaction with the sensor array. For example, in a sensor logic having a CSD modulator, the sensor logic may be configured to evaluate the ratio of pulse widths of the modulator output, instead of the raw data counts being over or under a certain threshold.

Processing device 110 further includes processing logic 102. Processing logic 102 is configured to perform various operations of the MPSC scanning techniques described herein, where such operations may be implemented in firmware or, alternatively, in hardware and/or software. For example, processing logic 102 is configured to receive and store a measurement from sensor logic 101 for each of a plurality of scanning operations that are performed on sensor array 121, and then to de-convolute the received/stored measurements in order to obtain data values (e.g., such as digital counts) that respectively represent the self-capacitances of the sensor elements of the sensor array at a given time. Processing logic 102 may then use the data values to determine whether a conductive object is detected on or in proximity to sensor array 121 (e.g., determining the presence of the object), where the object is detected on the sensor array (e.g., determining the position of the object), tracking the motion of the object, or determining other information related to the detected object.

In some embodiments, instead of using processing logic 102 to perform the above operations, processing device 110 may be configured to send measurements (e.g., raw data counts) or partially-processed data to a host, e.g., such as host 150. As illustrated in FIG. 1, host 150 may include decision logic 151 that is configured to perform some or all of the operations described above for processing logic 102. Operations of decision logic 151 may be implemented in firmware, hardware, software, or a combination thereof. Host 150 may include a high-level Application Programming Interface (API) for applications 152, which may be configured to perform routines on the received data for various operations that may be used to implement the MPSC scanning techniques described herein. Thus, in various embodiments the operations of processing logic 102 may be implemented in decision logic 151, applications 152, or in other hardware, software, and/or firmware external to processing device 110. In some embodiments, processing device 110 may be the host 150. In these and other embodiments, processing device 110 may also include non-sensing logic 103. Non-sensing logic 103 may be configured to process/receive/transmit data to and from host 150. For example, non-sensing logic 103 may include components that may be used to operate with processing device 110 and/or with sensor array 121 (e.g., such as keyboard, keypad, mouse, trackball, LEDs, displays, or other peripheral devices).

The MPSC scanning techniques described herein provide for use of multi-phase excitation methods when performing self-capacitance scanning operations on sensor arrays with multiple sensor elements. Such multi-phase excitation methods impact two scanning parameters (among others)—scanning time and signal-to-noise ratio (SNR). In various embodiments, these methods may decrease scanning time with a constant SNR or, alternatively, may increase the SNR if the scanning time is kept the same (e.g., constant) with respect to conventional self-capacitance scanning techniques. As a result, the MPSC scanning techniques described herein have higher sensitivity than conventional self-capacitance scanning techniques but create lower EM emissions. For example, in the best case, if the number of sensor elements of the sensor array is N, then scanning time can be decreased by N times or the SNR can be increased by $\sqrt{N}$ times. Further, according to the MPSC scanning techniques described herein, during a specific scanning operation all the sensor elements are sensed concurrently (e.g., simultaneously, or substantially simultaneously), but the polarity (e.g., phase shift) of the excitation signal for each sensor element depends on a specific multi-phase excitation pattern, and the number of such patterns is equal to the number of the sensor elements in the sensor array.

Table 1 below provides an example set of multi-phase excitation patterns and self-capacitance-value calculations for a sensor array with four sensor elements.

TABLE 1

Multi-Phase Excitation Patterns and Capacitance-Value Calculations Thereof

| Scanning Operations Order (Excitation Patterns) | Capacitance-Value Calculations |
|---|---|
| 1st scanning operation (pattern 1) | a1*C1 + a2*C2 + a3*C3 − a4*C4 = A |
| 2nd scanning operation (pattern 2) | a1*C1 + a2*C2 − a3*C3 + a4*C4 = B |
| 3rd scanning operation (pattern 3) | a1*C1 − a2*C2 + a3*C3 + a4*C4 = C |
| 4th scanning operation (pattern 4) | −a1*C1 + a2*C2 + a3*C3 + a4*C4 = D |

In Table 1 above, patterns 1-4 are used for the $1^{st}$ to $4^{th}$ scanning operations, respectively; C1, C2, C3 and C4 are the sensor elements' capacitances; a1, a2, a3 and a4 are the constants defined by the excitation voltages and the sensing channel transfer function of the sensor logic; and A, B, C and D are the measurement results obtained by the processing device. The polarity minus (the "−" sign in front of a constant in Table 1) indicates that the excitation signal for the corresponding sensor element has an opposite polarity/phase shift (e.g., a 180° phase shift) than the excitation signals for other sensor elements.

According to the multi-phase excitation patterns in Table 1, the following system of equations (1) can be formed and used by a processing device when scanning the sensor array:

$$\begin{bmatrix} a1 & a2 & a3 & -a4 \\ a1 & a2 & -a3 & a4 \\ a1 & -a2 & a3 & a4 \\ -a1 & a2 & a3 & a4 \end{bmatrix} \times \begin{bmatrix} C_1 \\ C_2 \\ C_3 \\ C_4 \end{bmatrix} = \begin{bmatrix} A \\ B \\ C \\ D \end{bmatrix} \quad (1)$$

In practice, for most embodiments the excitation voltages and the sensing channel transfer function are the same, so equation (2) below holds true:

$$a1=a2=a3=a4=a \quad (2)$$

Thus, the system of equations (1) can be rewritten as the system of equations (3) below:

$$\begin{bmatrix} 1 & 1 & 1 & -1 \\ 1 & 1 & -1 & 1 \\ 1 & -1 & 1 & 1 \\ -1 & 1 & 1 & 1 \end{bmatrix} \times \begin{bmatrix} C_1 \\ C_2 \\ C_3 \\ C_4 \end{bmatrix} = \begin{bmatrix} A' \\ B' \\ C' \\ D' \end{bmatrix} \quad (3)$$

where A'=A/a, B'=B/a, C'=C/a, and D'=D/a. The left matrix in the system of equations (3) is referred to as the "excitation matrix" as it stores information representing the excitation patterns that can be used by the processing device to drive the excitation signals on the sensor elements of the sensor array. In some embodiments, a processing device implements the excitation matrix as a data structure with data stored in volatile and/or non-volatile memory that is accessible by the various components of the processing device.

After the processing device performs the scanning operations to obtain corresponding measurements, the processing device can use the system of equations (4) below in order to calculate the data values that represent the self-capacitances of sensor elements of the sensor array:

$$\begin{bmatrix} C_1 \\ C_2 \\ C_3 \\ C_4 \end{bmatrix} = \begin{bmatrix} 0.25 & 0.25 & 0.25 & -0.25 \\ 0.25 & 0.25 & -0.25 & 0.25 \\ 0.25 & -0.25 & 0.25 & 0.25 \\ -0.25 & 0.25 & 0.25 & 0.25 \end{bmatrix} \times \begin{bmatrix} A' \\ B' \\ C' \\ D' \end{bmatrix} \quad (4)$$

The middle matrix in the system of equations (4) is referred to as the "deconvolution matrix" as it stores deconvolution coefficients that can be used by the processing device to calculate data values representing the measured self-capacitances for each of the sensor elements of the sensor array. In some embodiments, a processing device implements the deconvolution matrix as a data structure with deconvolution coefficients data stored in volatile and/or non-volatile memory that is accessible by the various components of the processing device.

Each row in the system of equations (4) represents a finite impulse response (FIR) filter and the deconvolution coefficients can be considered as the FIR filter's coefficients. The noise suppression ratio $K_{ns}$ of the FIR filter is represented by equation (5) below:

$$K_{ns} = \frac{1}{\sqrt{\sum_{i=1}^{N} sl_i^2}} \quad (5)$$

where $sl_i$ are the deconvolution coefficients from any row and N is the number of the elements in this row.

In order to provide the MPSC scanning techniques described herein, the measuring and scanning components of various embodiments have to measure values that are directly proportional to the sensor elements capacitances' sum and subtraction (difference). For example, in some embodiments the MPSC scanning techniques can be used with a passive integrator and an active integrator. An embodiment with a passive integrator uses the charge-transfer method where the charge is shared between the sensor element capacitance and the integrator or modulator capacitance. Thus, in such embodiment the integrator or modulator capacitances have to be of a much higher value than the sensor element capacitance.

Figure 2:
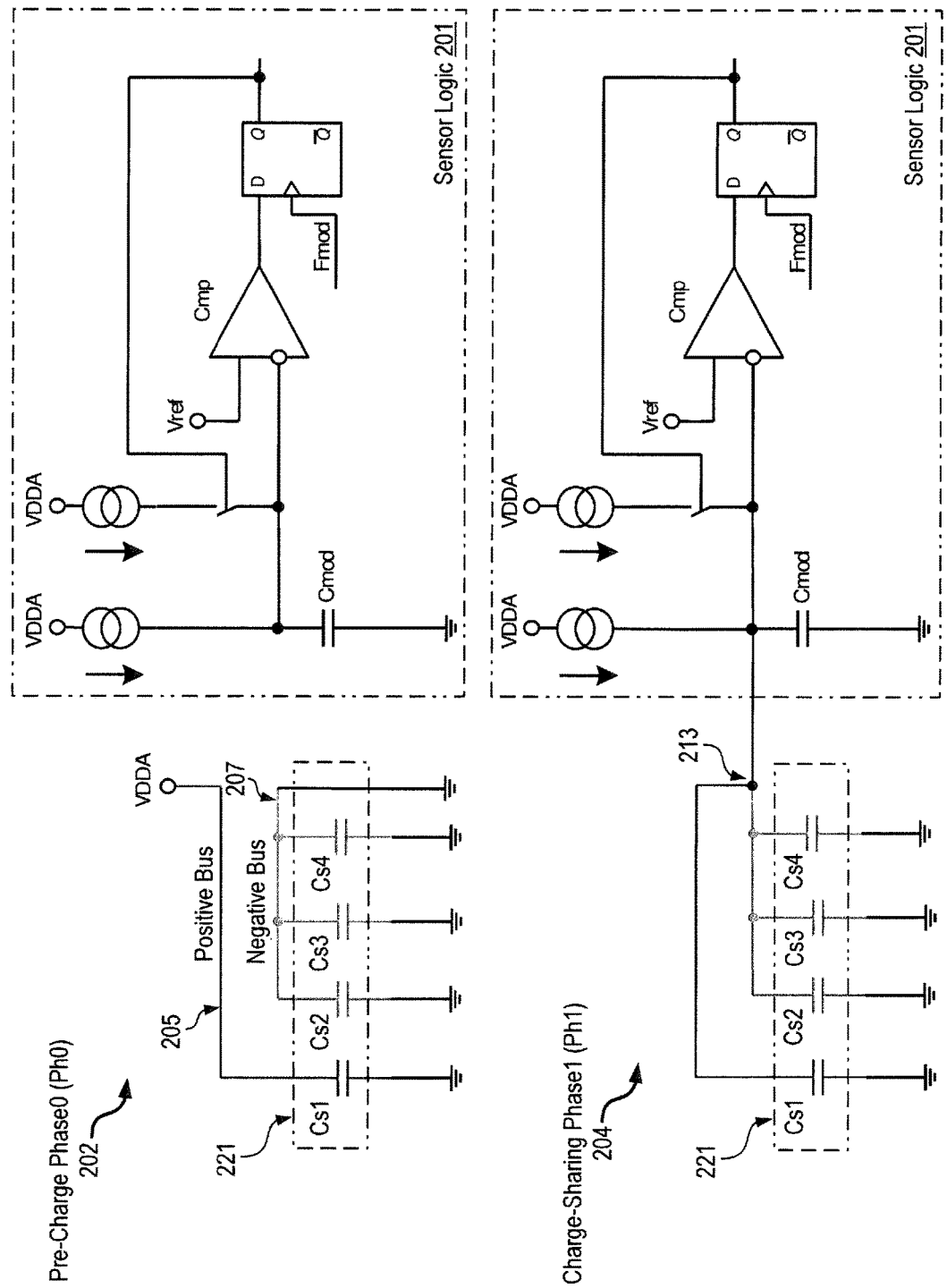
FIG. 2 is a block diagram illustrating various phases (cycles) for MPSC scanning operations that use a capacitance sigma-delta (CSD) modulator circuit, according to an example embodiment.

FIG. 2 illustrates the phases (cycles) for a scanning operation that is implemented with a capacitance sigma-delta (CSD) modulator circuit in an example embodiment according to the MPSC scanning techniques described herein. Two charge-transfer types can be implemented in this example embodiment—"negative" and "positive". FIG. 2 illustrates these two schematic types in the operational context of sensor logic 201 coupled to sensor array 221. Sensor logic 201 includes the CSD modulator circuit and a sensor scanning sequencer (not shown) that is configured to control a scanning operation in two phases: a pre-charge phase 202 (Ph0) and a charge-transfer phase 204 (Ph1). In the pre-charge phase 202 of the scanning operation, sensor logic 201 (e.g., per its scanning sequencer) is configured to couple the sensor elements of sensor array 221 over positive bus 205 and negative bus 207, where excitation signals provided on the positive bus 205 have a different or opposite polarity (e.g., a 180° phase shift) than the excitation signals provided on the negative bus 207. During the pre-charge phase 202, one of the sensor elements is coupled to the positive bus and the remaining sensor elements are coupled to the negative bus. In the negative charge-transfer circuit (e.g., over bus 207), a sensor element (e.g., each of "Cs2", "Cs3", and "Cs4") is coupled to the system ground and as a result its capacitance ("Csn") charge becomes zero. In the positive charge-transfer circuit (e.g., over bus 205), one sensor element (e.g., "Cs1") is coupled to a power supply (e.g., "VDDA") and as a result its capacitance ("Csp") charge becomes $C_{sp}$*VDDA. According to the MPSC scanning techniques described herein, in the charge-sharing phase 204 of the scanning operation, all sensor elements (e.g., "Cs1", "Cs2", "Cs3", "Cs4") are coupled together (e.g., by using a suitable multiplexor) to the same node 213, which is coupled to the CSD modulator circuit with its capacitance ("Cmod"). Thus, each sensor element of sensor array 221 shares is capacitance charge (e.g. the sensor element with capacitance "Cs1" shares its charge "Csp*VDDA", and each of the sensor elements with capacitances "Cs2", "Cs3", and "Cs4" shares a charge of "Csn") with the CSD modulator circuit's capacitance ("Cmod"), per equations (6) and (7) below:

$$\Delta V_{Cmod} \approx V_{DDA} \cdot \frac{C_{sp}}{C_{mod}} \quad (6)$$

$$\Delta V_{Cmod} \approx -V_{ref} \cdot \frac{C_{sn}}{C_{mod}} \quad (7)$$

Thus, the total collective charge accumulated by all sensor elements during the scanning operation becomes proportional to the subtraction of the sensor elements' capacitances, per equation (8) below:

$$\Delta V_{Cmod} \approx V_{DDA} \cdot \frac{C_{sp} - C_{sn}}{C_{mod}} \quad (8)$$

Equation (8) indicates that the above excitation method with the two charge-transfer types can be readily used for multi-phase self-capacitance scanning operations. In some embodiments, such excitation method may be implemented by a sensor logic that is configured with a two-phase sequencer. For example, during the excitation/pre-charge phase the sensor logic can be configured to couple a group of one or more sensor elements to the positive charge-transfer bus and the remaining sensor elements to the negative charge-transfer bus. Then, during the scanning/charge-transfer phase, the sensor logic is configured to couple to each other, and to scan, all sensor elements concurrently in order to measure a summing current (or voltage) that represents the collective charge of all sensor elements accumulated during the excitation phase. This summing current (or voltage) is equal (or proportional) to the difference between a sum of the currents of the negatively-excited sensor elements and a sum of the current(s) of the positively-excited sensor elements. (While this technique is illustrated in FIG. 2 and in other figures heretofore for four sensor elements, it is noted that the MPSC techniques described herein are not limited to four sensor elements, and that various embodiments can be used with sensor arrays that have various numbers of sensor elements—e.g., such as sensor arrays with up to 71 sensor elements). For example, in the embodiment of FIG. 2, during the pre-charging phase 202 a group of one "positive" sensor element is coupled to power supply "VDDA" over positive bus 205 and a group of three "negative" sensor elements is coupled to ground over negative bus 207. During the charge-sharing phase 204, all the sensor elements are coupled together over common node 213 to the CSD modulator circuit with its capacitance ("Cmod"). The convertor in the CSD modulator circuit keeps the voltage "Vcmod" at node 213 about (e.g., very close to) the reference voltage "Vref". In a preferable configuration, the reference voltage "Vref" is kept at about one-half of the supply voltage VDDA, i.e., $V_{ref} \approx \frac{1}{2}VDDA$. In other configurations, different values can be used for VDDA provided that the deconvolution coefficients are adjusted accordingly, where these coefficients depend on the relation between "VDDA" and "Vref" (as will be described heretofore).

Figure 3A:
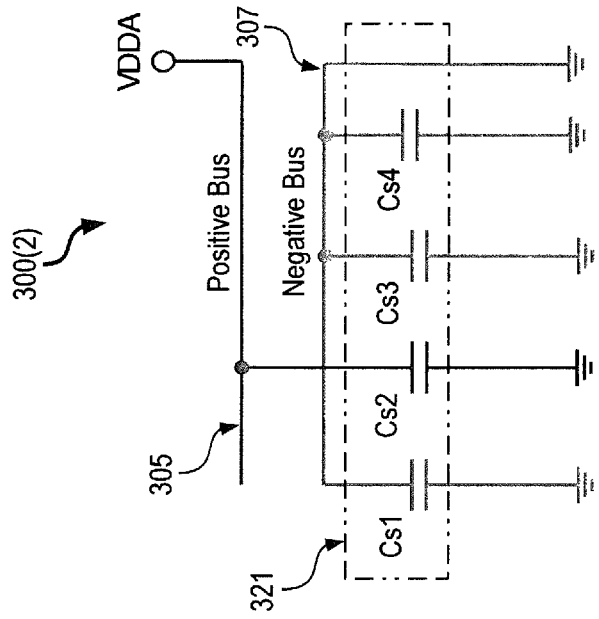
FIGS. 3A-3D are block diagrams illustrating MPSC scanning operation patterns according to an example embodiment.

FIGS. 3A-3D are block diagrams illustrating multi-phase excitation patterns for a scanning operation in accordance with the MPSC scanning techniques described herein. In FIG. 3A, excitation pattern 300(1) for a pre-charge phase of a scanning operation is illustrated in the context of sensor array 321, where one of the sensor elements ("Cs1") is coupled to the positive bus 305 (e.g., to receive an excitation signal with a positive polarity) and the remaining sensor elements ("Cs2", "Cs3", and "Cs4") are coupled to the negative bus 307 that is coupled to ground (e.g., to receive an excitation signal with a different polarity). According to the MPSC scanning techniques described herein, in the charge-transfer phase of the scanning operation, all sensor elements (e.g., "Cs1", "Cs2", "Cs3", "Cs4") are coupled together and a sensor logic (not shown) is configured to measure the collective charge $Q_{sum1}$ accumulated by all sensor elements during the pre-charge phase. The collective charge $Q_{sum1}$ is represented by equation (9) below:

$$Q_{sum1} = C_{s1} \cdot (V_{DDA} - V_{ref}) - V_{ref}(C_{s2} + C_{s3} + C_{s4}) \quad (9)$$

Figure 3B:
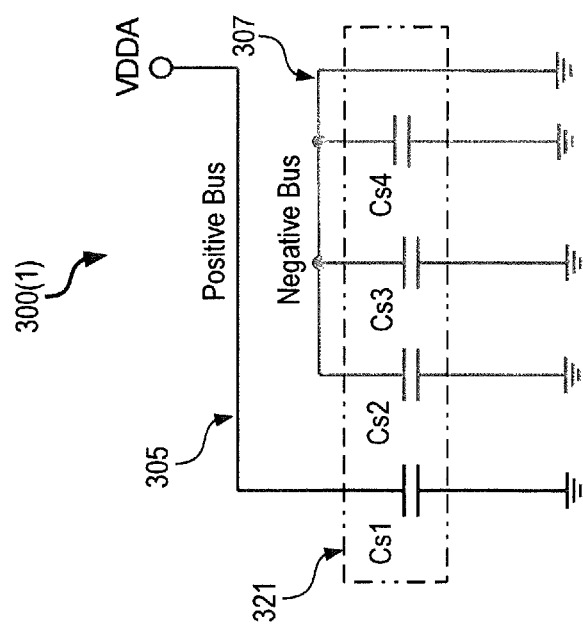

In FIG. 3B, excitation pattern 300(2) for the pre-charge phase of a scanning operation is illustrated in the context of sensor array 321, where one sensor element ("Cs2") is coupled to the positive bus 305 (e.g., to receive an excitation signal with a positive polarity) and the remaining sensor elements ("Cs1", "Cs3", and "Cs4") are coupled to the negative bus 307 that is coupled to ground (e.g., to receive an excitation signal with a different polarity). According to the MPSC scanning techniques described herein, in the charge-transfer phase of the scanning operation, all sensor elements (e.g., "Cs1", "Cs2", "Cs3", "Cs4") are coupled together and a sensor logic (not shown) is configured to measure the collective charge $Q_{sum2}$ accumulated by all sensor elements during the pre-charge phase. The collective charge $Q_{sum2}$ is represented by equation (10) below:

$$Q_{sum2} = C_{s2} \cdot (V_{DDA} - V_{ref}) - V_{ref}(C_{s1} + C_{s3} + C_{s4}) \quad (10)$$

Figure 3C:
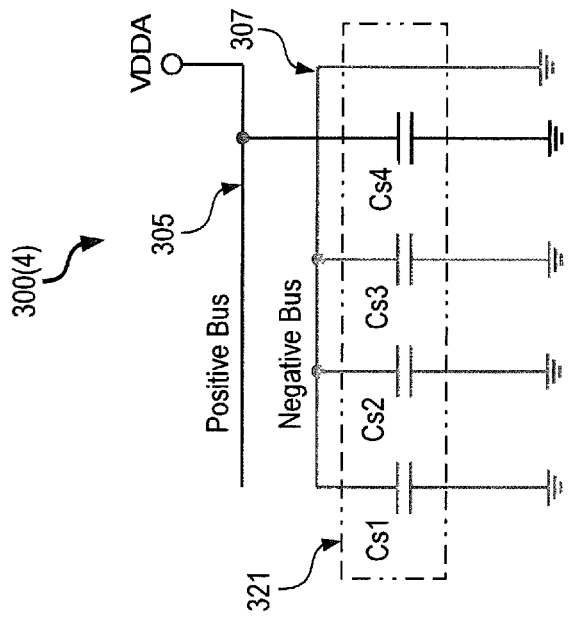

In FIG. 3C, excitation pattern 300(3) for the pre-charge phase of a scanning operation is illustrated in the context of sensor array 321, where one sensor element ("Cs3") is coupled to the positive bus 305 (e.g., to receive an excitation signal with a positive polarity) and the remaining sensor elements ("Cs1", "Cs2", and "Cs4") are coupled to the negative bus 307 that is coupled to ground (e.g., to receive an excitation signal with a different polarity). According to the MPSC scanning techniques described herein, in the charge-transfer phase of the scanning operation, all sensor elements (e.g., "Cs1", "Cs2", "Cs3", "Cs4") are coupled together and a sensor logic (not shown) is configured to measure the collective charge $Q_{sum3}$ accumulated by all sensor elements during the pre-charge phase. The collective charge $Q_{sum3}$ is represented by equation (11) below:

$$Q_{sum3} = C_{s3} \cdot (V_{DDA} - V_{ref}) - V_{ref}(C_{s1} + C_{s2} + C_{s4}) \quad (11)$$

Figure 3D:
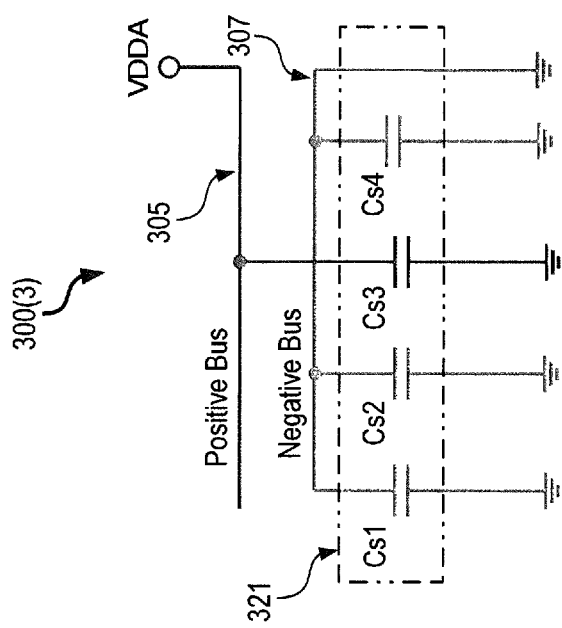

In FIG. 3D, excitation pattern 300(4) for the pre-charge phase of a scanning operation is illustrated in the context of sensor array 321, where one sensor element ("Cs4") is coupled to the positive bus 305 (e.g., to receive an excitation signal with a positive polarity) and the remaining sensor elements ("Cs1", "Cs2", and "Cs3") are coupled to the negative bus 307 that is coupled to ground (e.g., to receive an excitation signal with a different polarity). According to the MPSC scanning techniques described herein, in the charge-transfer phase of the scanning operation, all sensor elements (e.g., "Cs1", "Cs2", "Cs3", "Cs4") are coupled together and a sensor logic (not shown) is configured to measure the collective charge $Q_{sum4}$ accumulated by all sensor elements during the pre-charge phase. The collective charge $Q_{sum4}$ is represented by equation (12) below:

$$Q_{sum4} = C_{s4} \cdot (V_{DDA} - V_{ref}) - V_{ref}(C_{s1} + C_{s2} + C_{s3}) \quad (12)$$

Figure 4:
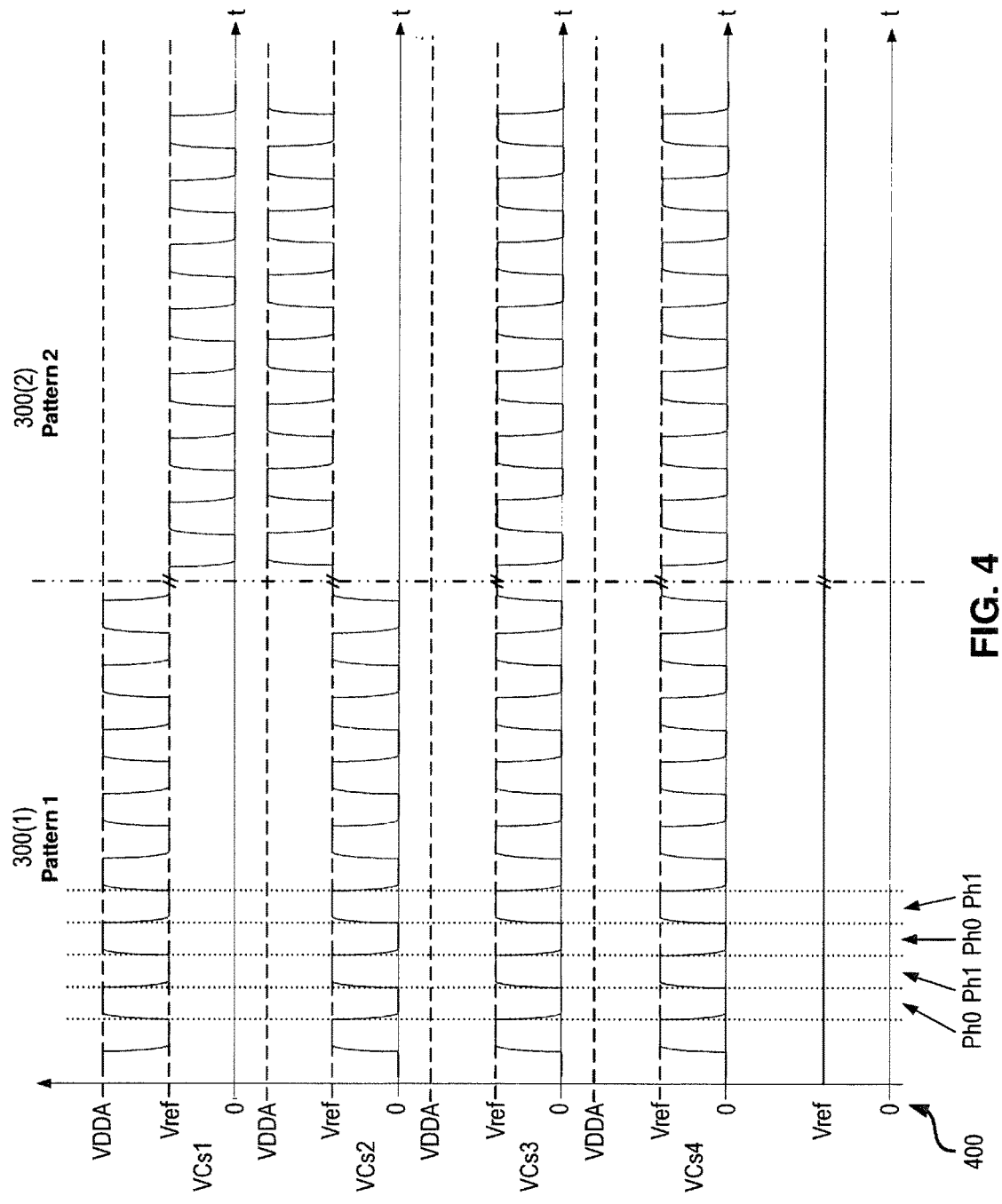
FIG. 4 is a timing diagram illustrating example voltage waveforms for MPSC scanning operation patterns, e.g., according to the example embodiment of FIGS. 3A-D.

FIG. 4 shows timing diagram 400 that illustrates voltage waveforms for the excitation patterns 300(1) and 300(2) according to the example embodiment of FIGS. 3A-B, respectively. In timing diagram 400, "VCs1", "VCs2", "VCs3", and "VCs4" represent the voltages of the excitation signals in a pre-charge phase ("Ph0") for the four sensor elements of the sensor array, respectively, and "Vref" represents the reference voltage used by the CSD modulator circuit of the sensor logic that is set as $V_{ref} = \frac{1}{2}VDDA$.

According to the MPSC scanning techniques described herein, a sensor logic performs a scanning operation in the above two-phase manner for each sensor element "i" in the sensor array to obtain and store a corresponding measurement that represents the collective charge $Q_{sum_i}$ accumulated by the sensor elements in that particular scanning operation. After the scanning operations are performed, there are four equations and four variables. Thus, the excitation matrix representing these scanning operations can written according to the system of equation (13) below:

$$\begin{bmatrix} Q_{sum1} \\ Q_{sum2} \\ Q_{sum3} \\ Q_{sum4} \end{bmatrix} = \begin{bmatrix} V_{DDA} - V_{ref} & -V_{ref} & -V_{ref} & -V_{ref} \\ -V_{ref} & V_{DDA} - V_{ref} & -V_{ref} & -V_{ref} \\ -V_{ref} & -V_{ref} & V_{DDA} - V_{ref} & -V_{ref} \\ -V_{ref} & -V_{ref} & -V_{ref} & V_{DDA} - V_{ref} \end{bmatrix} \times \begin{bmatrix} C_{s1} \\ C_{s2} \\ C_{s3} \\ C_{s4} \end{bmatrix} \quad (13)$$

A processing logic (and/or a component thereof) can then solve the system of equations (13) in order to obtain the data values ("Cs1", "Cs2", "Cs3", and "Cs4") that represent the capacitances of the sensor elements of the array, according to the system of equations (14) below:

$$\begin{bmatrix} C_{s1} \\ C_{s2} \\ C_{s3} \\ C_{s4} \end{bmatrix} = \tag{14}$$

$$\begin{bmatrix} \frac{V_{DDA} - 3 \cdot V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} \\ \frac{V_{ref}}{V_{DDA}^2 - 4 \cdot V_{DDA} \cdot V_{ref}} & \frac{V_{DDA} - 3 \cdot V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} \\ \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{DDA} - 3 \cdot V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} \\ \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{ref}}{V_{DDA}^2 - 4 \cdot V_{DDA} \cdot V_{ref}} & \frac{V_{DDA} - 3 \cdot V_{ref}}{V_{DDA}^2 - 4 \cdot V_{DDA} \cdot V_{ref}} \end{bmatrix} \times \begin{bmatrix} Q_{sum1} \\ Q_{sum2} \\ Q_{sum3} \\ Q_{sum4} \end{bmatrix}$$

In an embodiment where the reference voltage used by the CSD modulator circuit of the sensor logic is set as $V_{ref} = \frac{1}{2} VDDA$, the processing logic can use the system of equations (14) to convert the measured charge (raw data counts) $Q_{sum_1}$, $Q_{sum_2}$, $Q_{sum_3}$, and $Q_{sum_4}$ into data values (also referred as "code", or digital data values) that represent the self-capacitances of the sensor elements, as expressed in the system of equations (15) below:

$$\begin{bmatrix} C_{s1} \\ C_{s2} \\ C_{s3} \\ C_{s4} \end{bmatrix} = \begin{bmatrix} 0.25 & -0.25 & -0.25 & -0.25 \\ -0.25 & 0.25 & -0.25 & -0.25 \\ -0.25 & -0.25 & 0.25 & -0.25 \\ -0.25 & -0.25 & -0.25 & 0.25 \end{bmatrix} \times \begin{bmatrix} Q_{sum1} \\ Q_{sum2} \\ Q_{sum3} \\ Q_{sum4} \end{bmatrix} \tag{15}$$

In this embodiment, the noise suppression ratio of the FIR filter of the system is $K_{ns} = 2$. A noise suppression ratio $K_{ns}$ equal to "2" means that the white noise level in the MPSC scanning according to the techniques described herein is two (2) times lower than the noise suppression ratio for a conventional single-phase scanning that uses the same scanning time and the same excitation voltage "Vref" for a sensor array with the same number and type of sensor elements.

Various embodiments may use a reference voltage that is not substantially equal to half of the VDDA voltage, and in such embodiments the deconvolution coefficients (e.g., in the middle matrix of the system of equations 15) do not have equal absolute values. For example, if the reference voltage used by the CSD modulator circuit of the sensor logic is set as $V_{ref} = \frac{1}{3} VDDA$, then the system of equations (14) can be transformed in the system of equations (16) below:

$$\begin{bmatrix} C_{s1} \\ C_{s2} \\ C_{s3} \\ C_{s4} \end{bmatrix} = \begin{bmatrix} 0 & -0.33 & -0.33 & -0.33 \\ -0.33 & 0 & -0.33 & -0.33 \\ -0.33 & -0.33 & 0 & -0.33 \\ -0.33 & -0.33 & -0.33 & 0 \end{bmatrix} \times \begin{bmatrix} Q_{sum1} \\ Q_{sum2} \\ Q_{sum3} \\ Q_{sum4} \end{bmatrix} \tag{16}$$

In an embodiment that uses the above system of equations (16), the noise suppression ratio of the system is $K_{ns} = 1.75$. Thus, while this embodiment may be less effective for noise mitigation than an embodiment that uses a reference voltage that is substantially equal to half of the VDDA voltage, this embodiment illustrates that the techniques for MPSC scanning described herein may be embodied with various electronic components and comparators that use various reference voltages. It is noted, however, that as a general rule of the techniques described herein, a sum of the row value of the excitation/deconvolution matrix cannot be equal to a zero/null because the matrix would becomes singular and hence unsolvable. For example, if the reference voltage "Vref" is equal to a quarter of the VDDA voltage, the corresponding excitation/deconvolution matrix would be singular and therefore a processing logic would not be able to readily compute a solution based on the measurements received from the corresponding scanning operations. That is, the processing logic would not be able to deconvolute the received measurements into data values corresponding to the self-capacitances of the underlying sensor elements.

In some embodiments, the MPSC scanning techniques described herein may use longer multi-phase sequencers within sensor logic that uses any full-wave convertor to convert the whole of the excitation voltage waveform to an excitation signal of constant polarity (positive or negative). An example of such full-wave convertor is a CSD channel architecture that uses two integration capacitors. In example embodiments that use such channel architecture, the sequencer of the sensor logic may be configured to operate according to four phases.

Figure 5A:
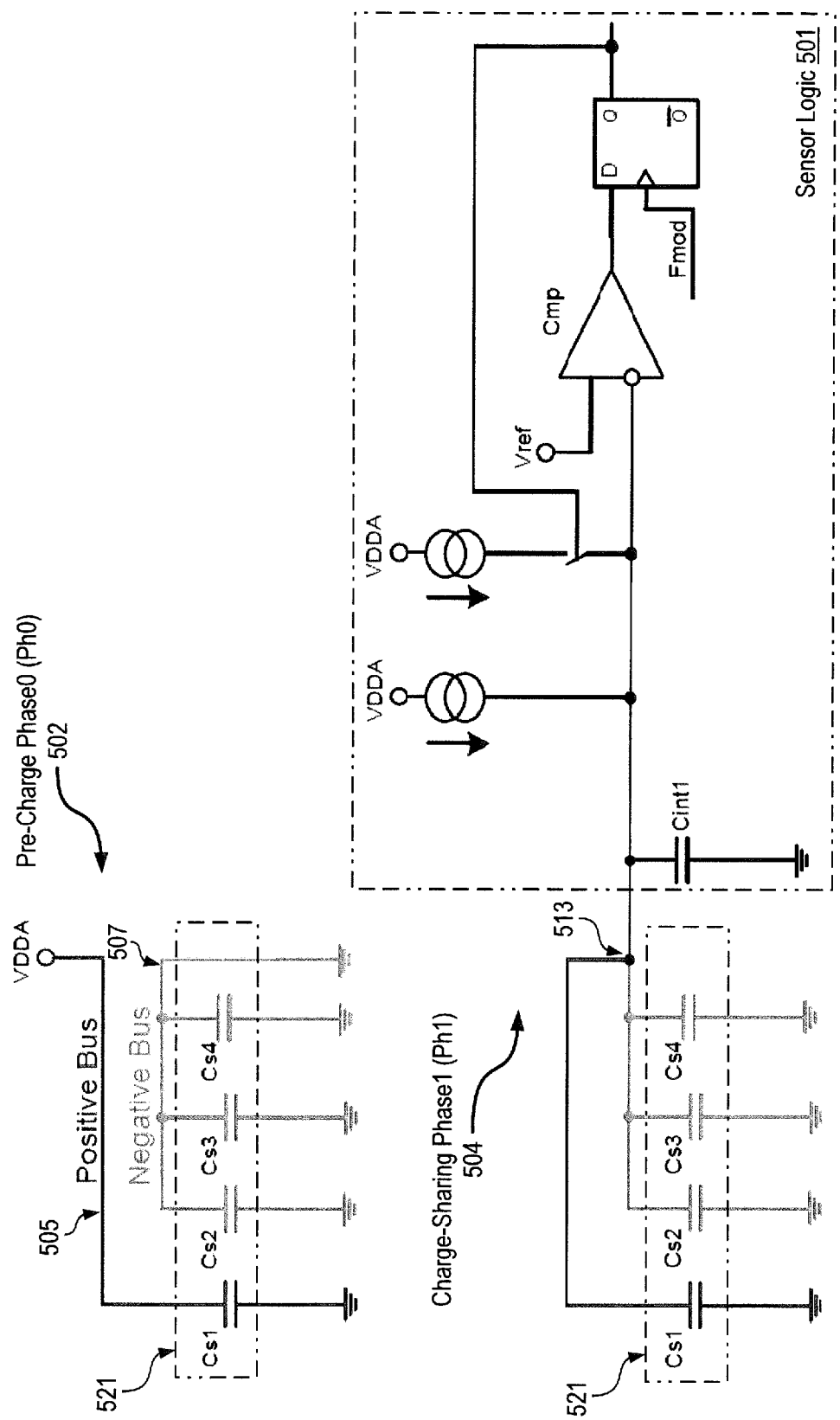
FIGS. 5A-5B are block diagrams illustrating various phases of MPSC scanning operations in a four-phase architecture, according to an example embodiment.
Figure 5B:
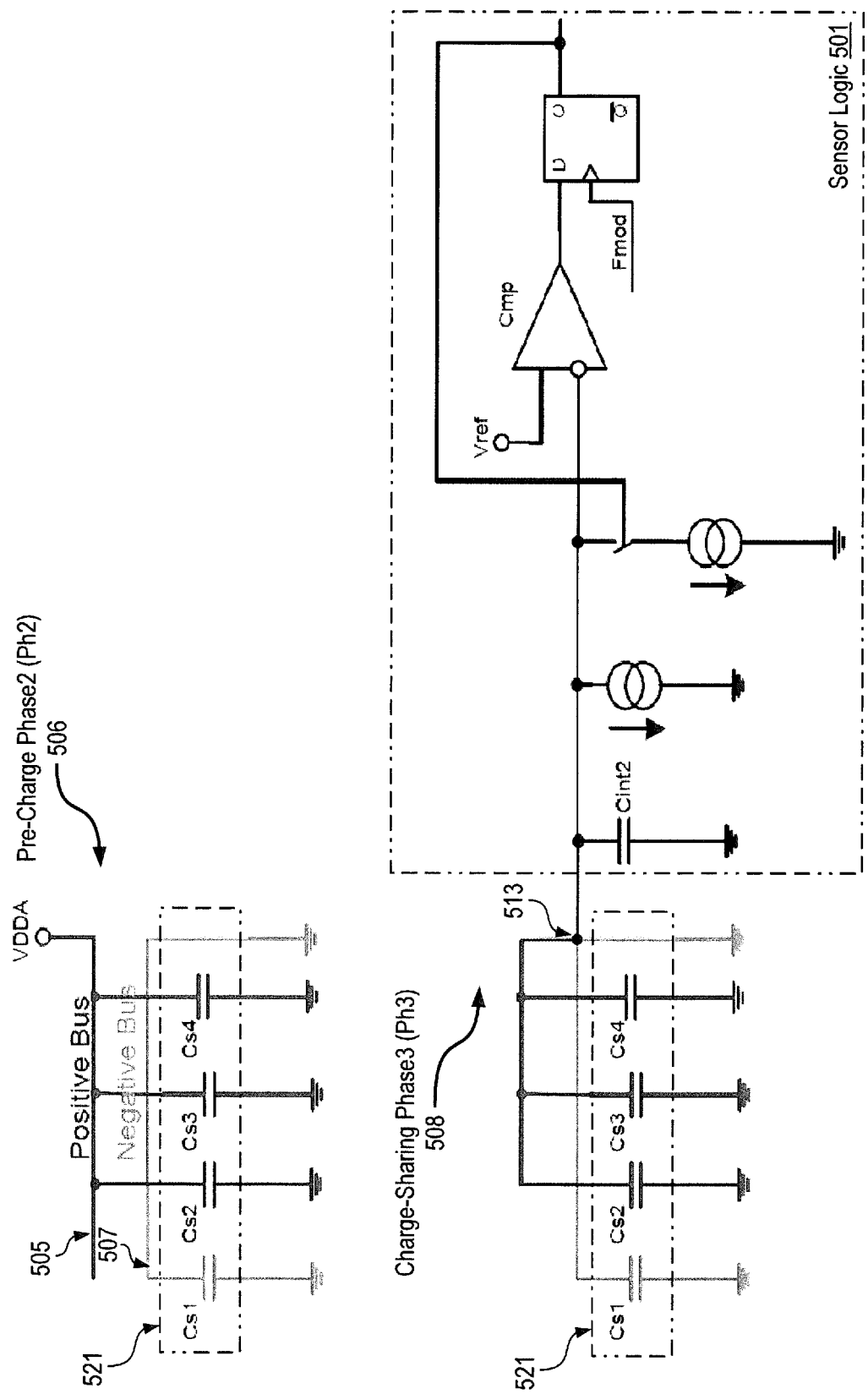

FIGS. 5A-5B are block diagrams illustrating the phases of MPSC scanning operations in such four-phase architecture, according to an example embodiment. In such embodiment, the pre-charging and the charge-sharing phases of a scanning operation are interlaced, but the pre-charging phases (of consecutive scanning operations) are performed according to different excitation patterns than the excitation patterns used in a two-phase architecture. For example, according to the four-phase excitation patterns, the "negative" and "positive" groups of sensor elements are swapped in the pre-charging phases of consecutive scanning operations. During the charge-sharing phases, the sensor elements are still coupled to each other and sensed together, but the integration capacitors "Cint" used by the four-phase sensor logic are different from the modulation capacitors "Cmod" used in the sensor logic for the two-phase architecture.

FIG. 5A illustrates the first two phases ("Ph0" and "Ph1") of a four-phase MSCP scanning operation. In the pre-charge phase 502 ("Ph0") of a first scanning operation, one of the sensor elements ("Cs1") of sensor array 521 is coupled to the positive bus 505 to receive an excitation signal based on the supply voltage "VDDA", while the remaining sensor elements ("Cs2", "Cs3", and "Cs4") are coupled to the negative bus 507 that is coupled to ground. In the charge-transfer phase 504 ("Ph1") of the first scanning operation, sensor logic 501 couples (or causes the coupling of) all sensor elements (e.g., "Cs1", "Cs2", "Cs3", "Cs4") together to the same node 513 (e.g., by using a suitable multiplexor). The sensor logic (or the components of the sensing channel thereof) then measure a signal representing the accumulated charge by all sensor elements based on a first integration capacitor with capacitance ("Cint1") that is coupled to a positive supply voltage source. FIG. 5B illustrates the last two phases ("Ph2" and "Ph3") of the four-phase MSCP scanning operation. In the pre-charge phase 506 ("Ph2") of a second scanning operation, the coupling of the sensor elements are swapped—that is, the sensor element ("Cs1") that was previously coupled to the positive bus 505 is now coupled to the negative bus 507, while the remaining sensor elements ("Cs2", "Cs3", and "Cs4") are now coupled to the positive bus 505. Then, in the charge-transfer phase 508 ("Ph3") of the second scanning operation, sensor logic 501 couples (or causes the coupling of) all sensor elements (e.g., "Cs1", "Cs2", "Cs3", "Cs4") together to the same node 513 (e.g., by using a suitable multiplexor). The sensor logic (or the components of the sensing channel thereof) then measures a signal representing the accumulated charge by all sensor elements based on a second integration capacitor with capacitance ("Cint2") that is coupled to a negative voltage supply source.

Figure 6:
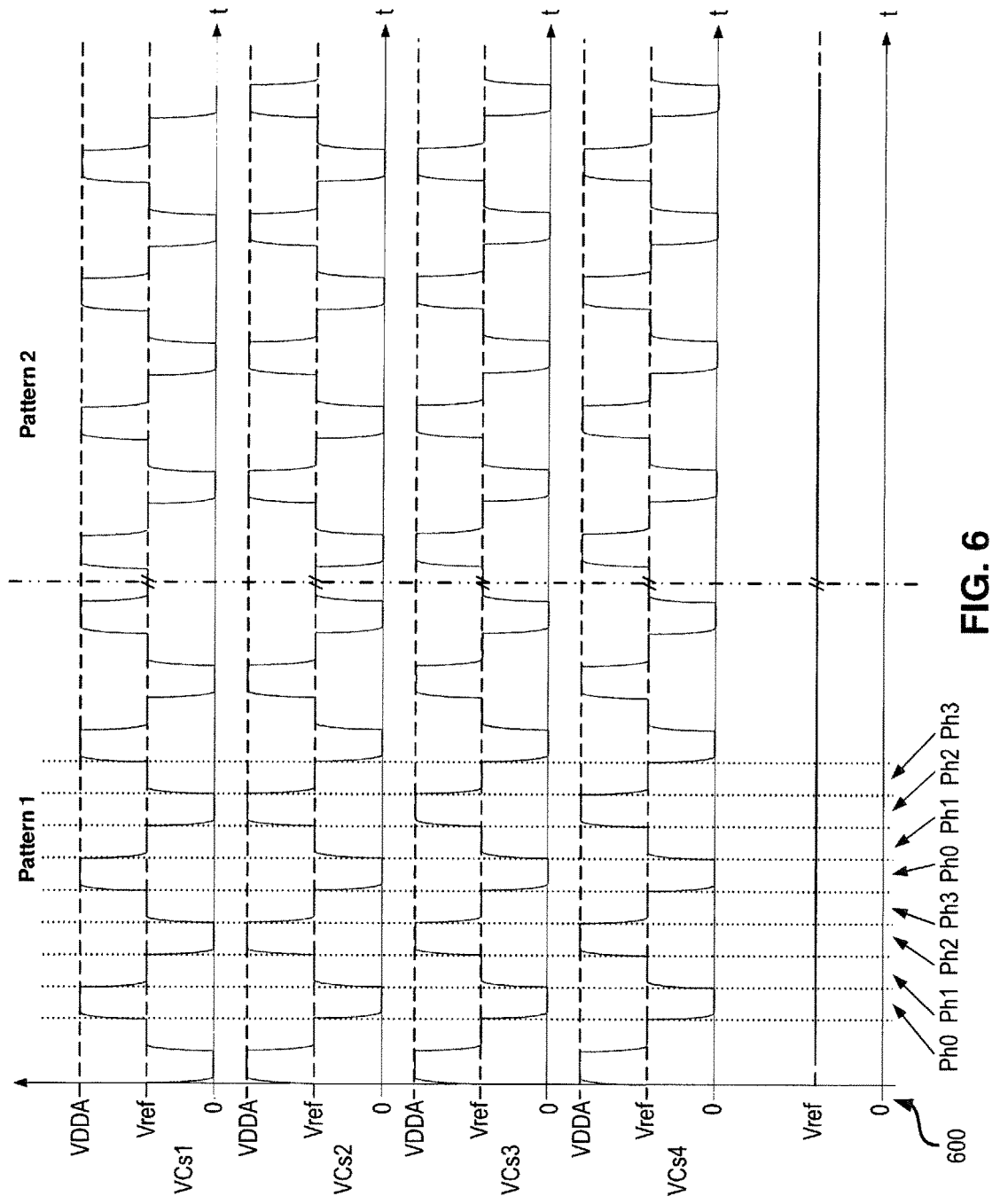
FIG. 6 is a timing diagram illustrating example voltage waveforms for MPSC scanning operation patterns, e.g., according to the example embodiment of FIGS. 5A-5B.

FIG. 6 shows timing diagram 600 that illustrates voltage waveforms for two of the excitation patterns according to the example embodiment of FIGS. 5A-5B. As illustrated in timing diagram 600, while the reference voltage used by the sensor logic is still set as $V_{ref}=\frac{1}{2}VDDA$, the full wave of the excitation signals voltages ("VCs1", "VCs2", "VCs3", and "VCs4") is used during the pre-charge phases "Ph0" and "Ph2". It is noted that other excitation patterns according to the four-phase architecture can be formed in a similar manner. Further, a processing logic uses a system of equations similar to (14) to compute the data values (e.g., "Cs1", "Cs2", "Cs3", and "Cs4") that represent the self-capacitances of the sensor elements of the sensor array 521, except that the coefficients in the deconvolution matrix correspond to a sum of the absolute values of the measured $Q_{sum_1}$, $Q_{sum_2}$, $Q_{sum_3}$, and $Q_{sum_4}$ charges injected to each of the two integration capacitors with the capacitances of $C_{int_1}$ and $C_{int_2}$, respectively.

Various embodiments of the MPSC scanning techniques described herein can use various sensor arrays having multiple sensor elements and sensor logic that has one receiving/sensing channel. Typically, mutual capacitance appears during operation between the sensor elements in the sensor arrays of such embodiments. Such mutual capacitance is parasitic in nature when the self-capacitance sensing is used, and the techniques described herein effectively eliminate the impact of the mutual capacitance in such embodiments. In this regard, FIG. 7A illustrates a fragment of an example sensor array with multiple sensor elements, and FIGS. 7B, 8A-8C show example schematics to illustrate the elimination of the impact of mutual capacitances.

Figure 7B:
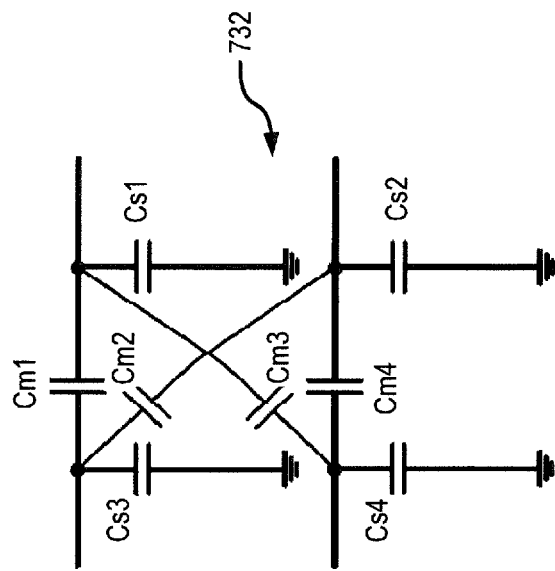
FIGS. 7A-7B are block diagrams illustrating a capacitance sensor array having self-capacitance sensor elements and the schematics thereof, respectively, according to an example embodiment.
Figure 7A:
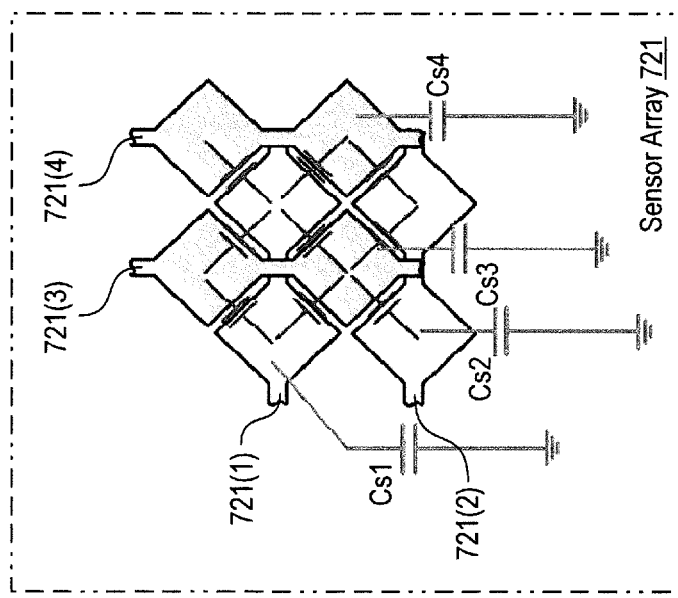
Figure 8B:
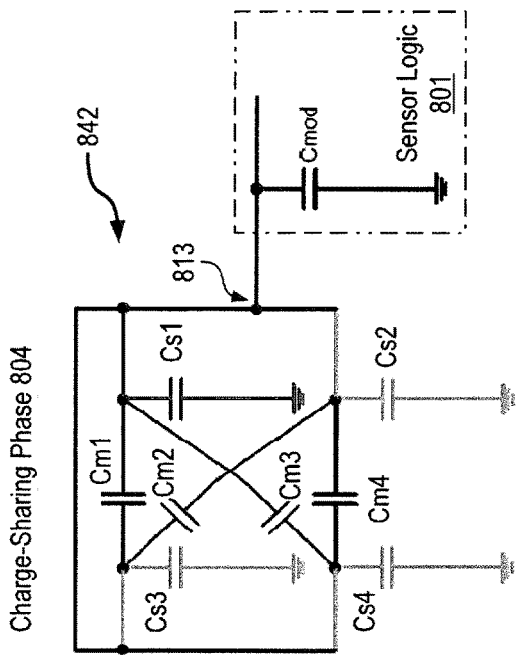
FIGS. 8A-8C are block diagrams illustrating example schematics of various phases of MPSC scanning operations for a capacitance sensor array, e.g., according to the example embodiment of FIGS. 7A-B.
Figure 8C:
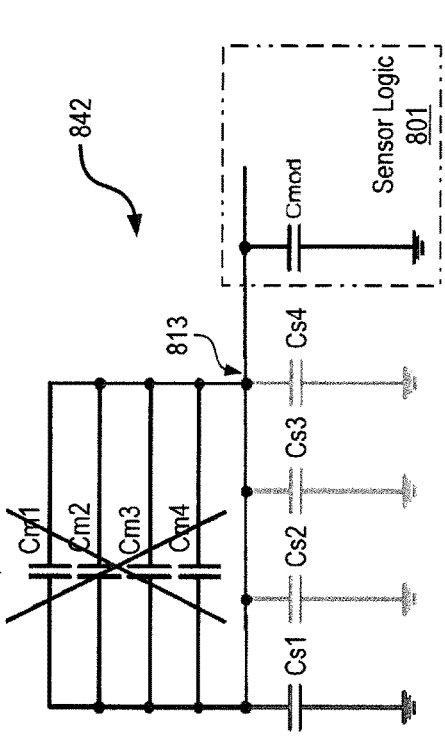

FIG. 7A illustrates the structure of a fragment of a sensor array with self-capacitance sensor elements. In FIG. 7A, sensor array 721 is formed by row electrodes, such as electrodes 721(1) and 721(2), and column electrodes, such as electrodes 721(3) and 721(4). While only two row electrodes and two column electrodes are shown in the sensor array fragment of FIG. 7A, it is noted that a sensor array may have any number (e.g., up to 71) of row and column electrodes. In sensor array 721, the row electrodes 721(1)-721(2) are electrically insulated from each other and from each of the column electrodes 721(3)-721(4), which are also electrically insulated from each other. Thus, during operation row electrode 721(1) may have self-capacitance "Cs1", row electrode 721(2) may have self-capacitance "Cs2", column electrode 721(3) may have self-capacitance "Cs3", and column electrode 721(4) may have self-capacitance "Cs4". However, as illustrated by the equivalent schematics 732 of FIG. 7B, during operation the row electrodes 721(1)-721(2) and the column electrodes 721(3)-721(4) may also be subject to capacitive coupling to each other. For example, mutual capacitance "Cm1" may be formed between row electrode 721(1) and column electrode 721(3), mutual capacitance "Cm2" may be formed between row electrode 721(2) and column electrode 721(3), mutual capacitance "Cm3" may be formed between row electrode 721(1) and column electrode 721(4), and mutual capacitance "Cm4" may be formed between row electrode 721(2) and column electrode 721(4). The elimination, according to the MPSC scanning techniques described herein, of these undesired mutual capacitances is illustrated in FIGS. 8A-8C.

Figure 8A:
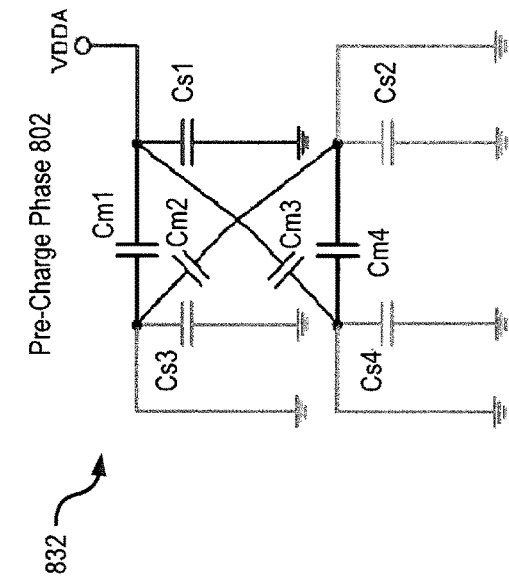

FIG. 8A shows schematic 832 that is equivalent to a pre-charge phase of a scanning operation on a sensor array, such as sensor array 721 of FIG. 7A. As illustrated in FIG. 8A, during the pre-charge phase 802 all of the parasitic mutual capacitors "Cm" collect some charge and therefore have some capacitance. FIGS. 8B-8C illustrate schematic 842 of the charge-sharing phase 804 of the scanning operation, during which all sensor elements of the sensor array are coupled together at node 813 (e.g., by a suitable multiplexor) and sensor logic 801 is coupled thereto to measure the collective charge accumulated by the sensor elements. During the charge-sharing phase 804, all of the "Cm" capacitors are shorted by themselves (as indicated more clearly by reference numeral 815 in FIG. 8C) when sensor logic 801 scans the sensor elements of the sensor array, which means that the "Cm" capacitances do not impact the accumulated charge value measured by sensor logic 801 at node 813. In this manner, the MPSC scanning techniques described herein provide for elimination of any parasitic mutual capacitances that may occur during the self-capacitance scanning of the sensor array.

In various embodiments, the MPSC scanning techniques described herein provide for avoiding some of the downsides that may be caused by conventional single-phase self-capacitance scanning. For example, in some embodiments the techniques described herein provide for low EM emissions (e.g., by avoiding the use of an active-shield signal), for high-sensitivity to determine presence, position and movement of conductive objects (e.g., by simultaneously scanning all sensor elements of a sensor array), and/or for water-resistant operation (e.g., by eliminating the mutual-capacitance side-effect of water that may be present on the sensor array). Further, in some embodiments the techniques described herein decrease scanning time with a constant SNR or increase the SNR if the scanning time is kept constant/consistent with conventional self-capacitance scanning techniques.

Various embodiments of the techniques for MPSC scanning of sensor arrays described herein may include various operations. These operations may be performed by hardware components, firmware/software, or a combination thereof. As used herein, the terms "coupled to" and "coupled with" mean coupled directly or coupled indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile storage and/or non-volatile storage. These instructions may be used to program one or more devices that include one or more general-purpose or special-purpose processors (e.g., such as Central Processing Units, or CPUs) or equivalents thereof (e.g., such as processing cores, processing engines, microcontrollers, and the like), so that when executed by the processor(s) or the equivalents thereof, the instructions cause the device(s) to perform the described operations for MPSC scanning of sensor arrays. The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed type of medium that is suitable for storing information.

Although the operations of any method(s) herein may be shown and described in a particular order, the order of the operations of each method may be altered so that certain operations may be performed in an inverse order or so that certain operation may be performed, at least in part, concurrently with other operations. In other embodiments, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device comprising:
   a sensor logic configured in each of a plurality of self-capacitance scanning operations to couple together and to concurrently sense a plurality of sensor elements of a sensor array, to obtain a plurality of measurements, wherein each measurement represents a collective charge of the plurality of sensor elements accumulated during a corresponding self-capacitance scanning operation of the plurality of self-capacitance scanning operations; and
   a processing logic configured to determine, based on the plurality of measurements, data values that respectively represent self-capacitances for each of the plurality of sensor elements.

2. The device of claim 1, wherein during a particular self-capacitance scanning operation of the plurality of self-capacitance scanning operations, the sensor logic is configured to excite a particular group of one or more sensor elements with a signal that has an opposite polarity than signals coupled to the remaining sensor elements of the plurality of sensor elements.

3. The device of claim 1, wherein the sensor logic is configured to excite the plurality of sensor elements according to an excitation matrix that represents a plurality of excitation patterns corresponding to the plurality of self-capacitance scanning operations.

4. The device of claim 3, further comprising a multiplexor configured to couple the sensor logic to the plurality of sensor elements in accordance with the plurality of excitation patterns.

5. The device of claim 1, wherein in each of the plurality of self-capacitance scanning operations, the sensor logic is configured to excite the plurality of sensor elements during a pre-charge phase and to measure the collective charge of the plurality of sensor elements during a charge-sharing phase.

6. The device of claim 1, wherein the sensor logic comprises a self-capacitance sensing channel, the self-capacitance sensing channel including one of a capacitance sigma-delta (CSD) modulator, a full-wave CSD modulator, and a slope convertor.

7. The device of claim 1, wherein the processing logic is configured to determine the data values based on a matrix of deconvolution coefficients that corresponds to the plurality of self-capacitance scanning operations.

8. The device of claim 1, wherein the plurality of measurements is representative of a conductive object that is in contact with or proximate to the sensor array.

9. The device of claim 8, wherein the processing logic is further configured to determine a position of the conductive object on the sensor array based on the data values.

10. A method of multi-phase self-capacitance scanning of a sensor array, the method comprising:
    obtaining a plurality of measurements from a corresponding plurality of self-capacitance scanning operations on the sensor array, wherein obtaining a measurement from a corresponding self-capacitance scanning operation comprises:
      coupling together a plurality of sensor elements of the sensor array; and
      concurrently sensing the plurality of sensor elements;
      wherein the measurement represents a collective charge of the plurality of sensor elements accumulated during the corresponding self-capacitance scanning operation; and
    determining, based on the plurality of measurements, data values that respectively represent self-capacitances for each of the plurality of sensor elements.

11. The method of claim 10, further comprising exciting a particular group of one or more sensor elements during a particular self-capacitance scanning operation of the plurality of self-capacitance scanning operations with a signal that has an opposite polarity than signals coupled to the remaining sensor elements of the plurality of sensor elements.

12. The method of claim 10, further comprising exciting the plurality of sensor elements according to an excitation matrix that represents a plurality of excitation patterns corresponding to the plurality of self-capacitance scanning operations.

13. The method of claim 10, further comprising exciting the plurality of sensor elements during a pre-charge phase in each of the plurality of self-capacitance scanning operations, wherein concurrently sensing the plurality of sensor elements comprises measuring the collective charge of the plurality of sensor elements during a charge-sharing phase.

14. The method of claim 10, wherein determining the data values comprises converting the plurality of measurements based on a matrix of deconvolution coefficients that corresponds to the plurality of self-capacitance scanning operations.

15. The method of claim 10, wherein the plurality of measurements is representative of a conductive object that is in contact with or proximate to the sensor array, and the method further comprises determining a position of the conductive object on the sensor array based on the data values.

16. A system comprising:
   a sensor array comprising a plurality of sensor elements;
   a sensor logic coupled to the sensor array, the sensor logic configured in each of a plurality of self-capacitance scanning operations to couple together and to concurrently sense the plurality of sensor elements to obtain a plurality of measurements, wherein each measurement represents a collective charge of the plurality of sensor elements accumulated during a corresponding self-capacitance scanning operation of the plurality of self-capacitance scanning operations; and
   a processing logic coupled to the sensor logic, the processing logic configured to determine, based on the plurality of measurements, data values that respectively represent self-capacitances for each of the plurality of sensor elements.

17. The system of claim 16, wherein during a particular self-capacitance scanning operation of the plurality of self-capacitance scanning operations, the sensor logic is configured to excite a particular group of one or more sensor elements with a signal that has an opposite polarity than signals coupled to the remaining sensor elements of the plurality of sensor elements.

18. The system of claim 16, wherein the plurality of sensor elements is multiple row electrodes or multiple column electrodes of the sensor array.

19. The system of claim 16, further comprising a multiplexor configured to couple the sensor logic to the plurality of sensor elements in accordance with a plurality of excitation patterns corresponding to the plurality of self-capacitance scanning operations.

20. The system of claim 16, wherein the plurality of measurements is representative of a conductive object that is in contact with or proximate to the sensor array, and the processing logic is further configured to determine a position of the conductive object on the sensor array based on the data values.

* * * * *